United States Patent [19]
Kim et al.

[11] Patent Number: 6,097,447
[45] Date of Patent: Aug. 1, 2000

[54] DIGITAL DEFLECTION CONTROL SYSTEM IN PROJECTION TV

[75] Inventors: Jung Tae Kim; Deuk Young Kwon, both of Seoul; Ki Hwan Kim; Hoe Jik Kim, both of Buchon; Kwang Hoon Park, Soowon, all of Rep. of Korea

[73] Assignee: SamSung Electronics Co., Ltd., Suwon, Rep. of Korea

[21] Appl. No.: 09/288,557

[22] Filed: Apr. 9, 1999

[30] Foreign Application Priority Data

Apr. 30, 1998 [KR] Rep. of Korea ............... 98-15658

[51] Int. Cl.[7] ............................................... H04N 3/22
[52] U.S. Cl. ................. 348/745; 348/806; 315/368.13
[58] Field of Search ........................... 348/745, 746, 348/747, 806, 807; 315/368.13, 399, 368.12

[56] References Cited

U.S. PATENT DOCUMENTS

| | | | |
|---|---|---|---|
| 5,463,427 | 10/1995 | Kawashima | 348/745 |
| 5,537,159 | 7/1996 | Suematsu et al. | 348/745 |
| 5,592,240 | 1/1997 | Sakamoto et al. | 348/806 |
| 5,694,181 | 12/1997 | Oh | 348/806 |
| 5,790,210 | 8/1998 | Kim et al. | 348/806 |
| 5,793,447 | 8/1998 | Fujiwara et al. | 348/806 |
| 5,963,274 | 10/1999 | Youn | 348/745 |

*Primary Examiner*—John K. Peng
*Assistant Examiner*—Trang Uyen Tran
*Attorney, Agent, or Firm*—Robert E. Bushnell, Esq.

[57] ABSTRACT

A digital deflection control system in a projection TV is provided which digitally integrates the configuration for converting the digital horizontal deflection signal outputted from the DCS into an analog signal to be applied to the deflection coil as an input, thereby reducing the production cost and realizing small-size product. The digital deflection control system includes an EEPROM for storing vertical and horizontal deflection seed data for R, G, B color signals, a CPU for loading each seed data from the EEPROM and performing the first interpolation for the horizontal deflection data, a digital conversion circuit for performing the second interpolation for the vertical deflection data among the data first-interpolated by the CPU, a digital deflection control for performing the third interpolation for the horizontal deflection data among the data second-interpolated by the digital conversion circuit, a D/A converter for outputting the data third-interpolated by the digital deflection control as an analog signal in the form of step wave, and a filter for removing high frequency component from the signal in step waveform outputted from the D/A converter.

3 Claims, 8 Drawing Sheets

DIGITAL DEFLECTION CONTROL SYSTEM IN PROJECTION TV

BACKGROUND OF THE INVENTION

1. Field of the Invention

The present invention relates to a digital deflection control system in a projection TV and, more particularly, to a digital deflection control system in a projection TV, which digitally interpolates the horizontal deflection signal for three red, green and blue color signals which are color image signals.

2. Discussion of Related Art

In a projection TV, picture light emitted from its optical projection unit is obliquely projected to the screen since its optical system is generally arranged unsymmetrically to the screen. This brings about distortion in images projected to the screen. To correct this, the picture light is intentionally distorted before it is projected to cancel the distortion caused by the optical system. This process is generally called matching correction. While the matching correction is performed by employing an analog or digital approach, there has been recently proposed and used a method, one of the digital approach, which controls the horizontal and vertical deflection signals themselves supplied from the deflection system.

FIG. 1 shows a block diagram of a conventional digital deflection control system in a projection TV. Referring to FIG. 1, the digital deflection control system of the conventional projection TV includes an electrically erasable programmable read only memory (EEPROM) 10 which stores seed data for generating horizontal and vertical deflection signals for red, green and blue (R, G, B) colors, a central process unit (CPU) 20 which loads the seed data for R, G, B stored in EEPROM 10 when the system is reset and then carries out first interpolation for the seed data (this interpolated data is called subseed data), a digital convergence system (DCS) 30 which secondary-interpolates the subseed data to generates digital horizontal and vertical deflection signals, and an analog circuit 70 which converts the digital horizontal and vertical deflection data outputted from DCS 30 into analog signals having corresponding magnitudes, amplifies them up to a predetermined level and applies them to horizontal and vertical deflection coils.

Analog circuit 70 consists of three D/A converters 40R, 40G and 40B which convert the subseed data for R, G, B outputted from DCS 30 into analog step waves having corresponding magnitudes, three analog switches 50R, 50G and 50B which are switched by horizontal and vertical output control signals HH and VH outputted from DCS 30 to output horizontal deflection signals RH, GH and BH and vertical deflection signals RV, RG and RB for R, G, B in the form of step wave, and six LPFs and amplifiers 60RH, 60GH, 60BH, 60RV, 60GV and 60BV which smooth horizontal and vertical deflection signals RH, GH, BH, RV, GV and BV in step waveform sent from analog switches 50R, 50G and 50B to waveform-shape them and then amplify them. The LPFs are conventionally configured of fifth-degree butterworth filters.

With the conventional digital deflection control system of the projection TV, CPU 20 performs first interpolation for the R, G, B horizontal and vertical seed data stored in EEPROM 10, for example, 5*5 data, to obtain 16*5 subseed data, and DCS 30 carries out secondary interpolation for the 16*5 subseed data to create 16*256 point data required for actual image representation, generating the horizontal and vertical deflection signals. Here, 16 and 256 mean horizontal and vertical deflection points, respectively. The point data created as above then passes through D/A converters 40R, 40G and 40B, analog switches 5R, 50G and 50B, and LPFs/amplifies 60RH, 60GH, 60BH, 60RV, 60GV and 60GV to be applied to the horizontal and vertical deflection coils.

As described above, however, the conventional digital deflection control system uses the D/A converters, analog switches and fifth-order LPF filters and amplifiers in order to convert the sixteen pieces of point data for generating the horizontal deflection signal into the analog signals, resulting in high production cost and large sized system.

SUMMARY OF THE INVENTION

Accordingly, the present invention is directed to a digital deflection control system in a projection TV that substantially obviates one or more of the problems due to limitations and disadvantages of the related art.

An object of the present invention is to provide a digital deflection control system in a projection TV, which digitally integrates the configuration for converting the digital horizontal deflection signal outputted from the OCS into an analog signal to be applied to the deflection coil as an input, thereby reducing the production cost and realizing small-size product.

To accomplish the object of the present invention, there is provided a digital deflection control system in a projection TV, the system including an EEPROM for storing vertical and horizontal deflection seed data for R, G, B color signals, a CPU for loading each seed data from the EEPROM and performing the first interpolation for the horizontal deflection data, a digital conversion circuit for performing the second interpolation for the vertical deflection data among the data first-interpolated by the CPU, a digital deflection control for performing the third interpolation for the horizontal deflection data among the data second-interpolated by the digital conversion circuit, a D/A converter for outputting the data third-interpolated by the digital deflection control as an analog signal in the form of step wave, and a filter for removing high frequency component from the signal in step waveform outputted from the D/A converter.

The digital deflection control includes a buffer for temporarily storing horizontal signal data for one horizontal line, second-interpolated by the digital conversion circuit, a subtracter for obtaining the difference (An+1)-An between two pieces of horizontal signal data An+1 and An for one horizontal line, sequentially inputted from the buffer, and outputting the subtraction result, a divider for dividing the difference obtained by the subtracter by a predetermined divisor, a shift register for storing the result value obtained by the divider, and performing shifting operation in synchronization with a clock signal at which following horizontal signal data An+2 is inputted, and an adder for adding horizontal signal data inputted from the digital conversion circuit at every specific clock to interpolation data stored in the shift register.

According to a preferred embodiment of the present invention the divisor is 4 or 8. The filter is a first order passive filter consisting of resistors and condensers. The digital conversion circuit, digital deflection control and D/A converter are configured of an ASIC.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
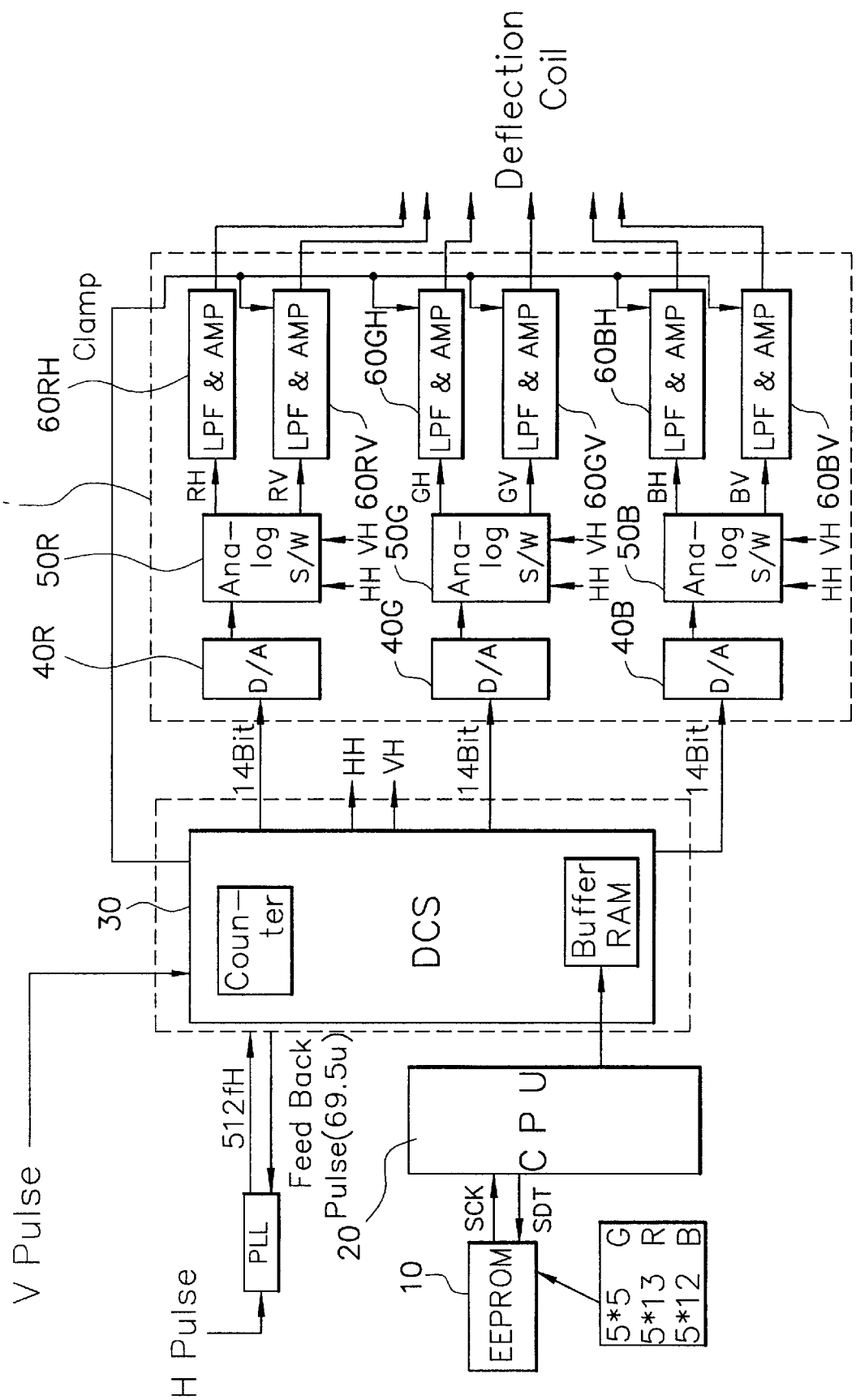
FIG. 1 is a block diagram of a conventional digital deflection control system in a projection TV.
Figure 2:
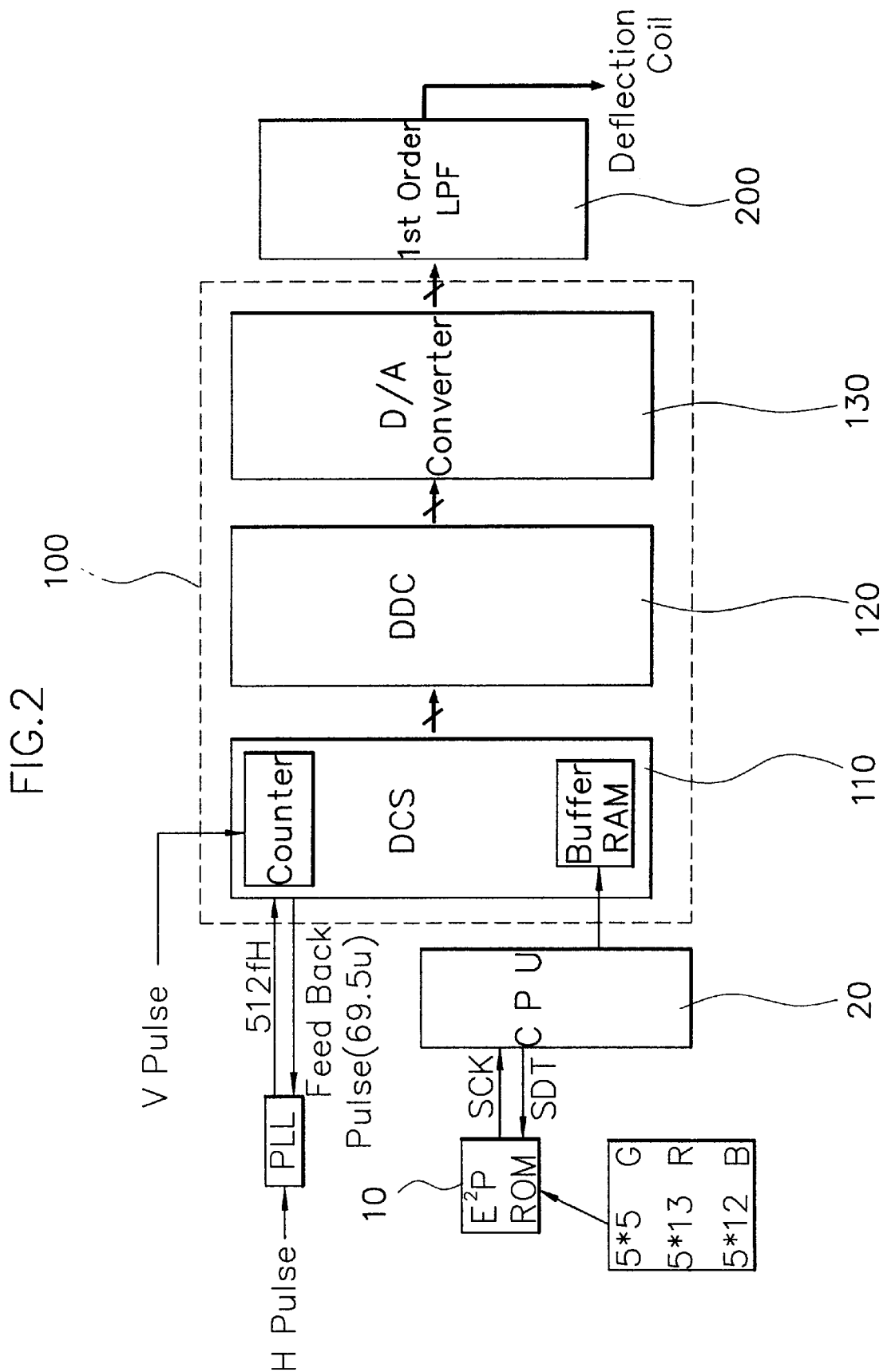
FIG. 2 is a block diagram of a digital deflection control system in a projection TV according to the present invention.

FIG. 2 is a block diagram of a digital deflection control system of a projection TV according to the present invention. Referring to FIG. 2, the digital deflection control system of the present invention includes an EEPROM 10 for storing seed data for generating R, G, B horizontal and vertical deflection signals, a CPU 20 for loading the seed data for R, G, B stored in EEPROM 10 when the system is reset and then performing the first interpolation for it to generate subseed data, a DCS 110 for second-interpolating the subseed data interpolated by CPU 20 to generate digital vertical deflection data and sparse digital horizontal deflection data (referred to hereinafter as point data), a digital deflection control (DDC) 120 for third-interpolating the horizonal deflection point data among the point data generated by DCS 110 to generate digital vertical deflection data and dense digital horizontal deflection data (final digital data), a D/A converter 130 for quantizing the bit stream of the final horizontal and vertical digital data sent from DDC 120 to generate an analog signal in the form of step wave, and a filter 200 for filtering high frequency component contained in the analog signal in step waveform outputted from D/A converter 130.

With the seed data stored in EEPROM 10, horizontal deflection data*vertical deflection data may be configured of 13*5 in case of R, 5*5 in case of G and 12*5 in case of B. DCS 110 performs secondary interpolation for the subseed data to generate 16×156 point data required for actual image representation. Here, 16 and 256 mean horizontal and vertical deflection points, respectively. DDC 120 carries out the third interpolation for the horizontal deflection point data among the point data outputted from DCS 110 to generate the final digital data, for example, 61*256 or 121*256 data. Here, 61 or 121 is the final digital data related with the horizontal deflection signal, and 256 is the final digital data related with the vertical deflection signal. Each of the final vertical and horizontal digital data sent to D/A converter 130 is configured of six signals of RH, RV, GH, GV, BH and BV and outputted as a 16-bit signal, for example.

Filter 200 which filters high frequency component included in the signal outputted from D/A converter 130 and applies the resulting signal to the deflection coil can be configured of a first order passive filter consisting of resistors and condensers, that is, first order RC filter, without employing a high order analog filter because the signal outputted from D/A converter 130 has a smooth waveform. Accordingly, DCS 110, DDC 120 and D/A converter 130 can be configured of an ASIC single chip 100.

Figure 3:
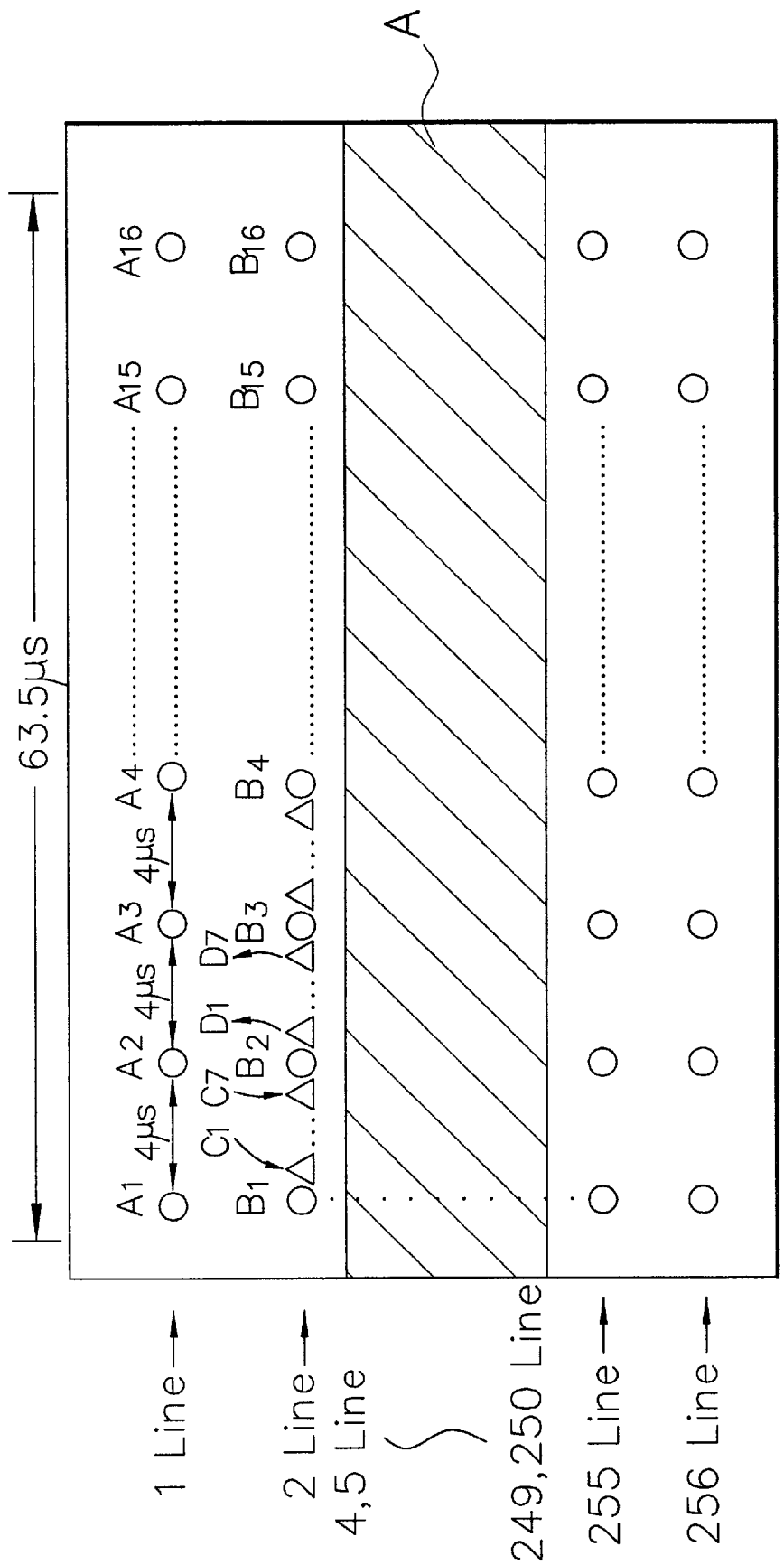
FIG. 3 illustrates a structure of picture point data of the picture of a projection TV for explaining the present invention.

FIG. 3 illustrates a structure of picture point data of a picture of the projection TV for explaining the preset invention. Referring to FIG. 3, the horizontal deflection point data outputted from DCS 110 constructs sixteen picture points which form one horizontal line constituting a screen picture. The vertical deflection point data constructs picture points forming 256 lines. Meanwhile, in the projection TV, the region actually displayed on the screen is generally from the fifth line (or sixth line) to the 249th line (250th line). The present invention performs interpolation using this characteristic in which the first horizontal line is not displayed on the screen. This will be explained below in detail in case that the final horizontal digital data is 121.

Figure 4:
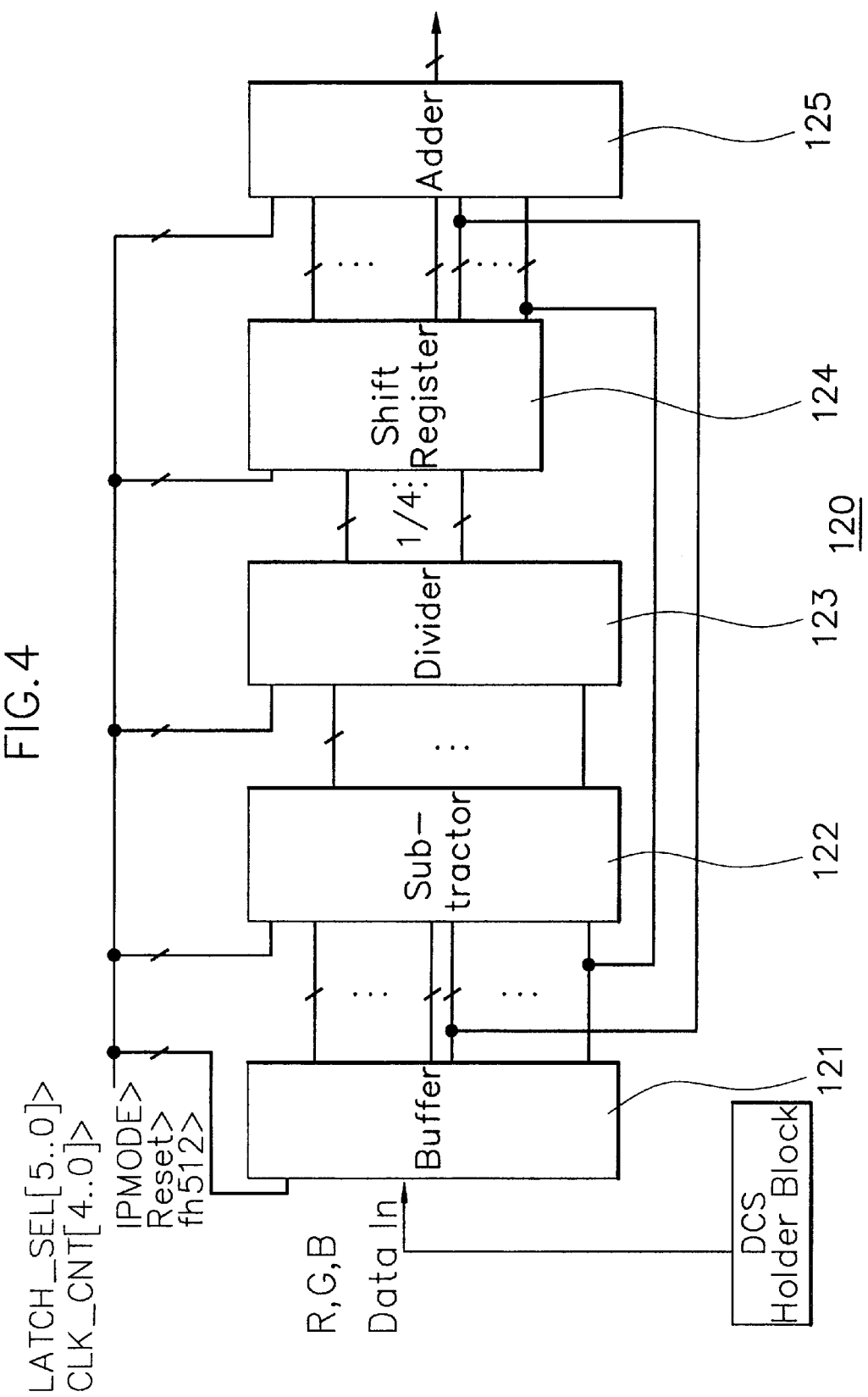
FIG. 4 is a block diagram of DDC of FIG. 2.

FIG. 4 is a block diagram of the DDC of FIG. 2. Referring to FIG. 4, DDC 120 includes a buffer 121 for temporarily storing in its first and second buffer (not shown) the second-interpolated sixteen pieces of point data (A(n): A1 or A16) of the first horizontal line, outputted from DCS 110, in synchronization with a master clock signal 512fH, a subtracter 122 for obtaining the difference between point data An and following point data An+1 which are successively inputted thereto, a divider 123 for dividing the resulting data obtained by subtracter 122 by 8 (4 when the final horizontal digital data is 61), a shift register 124 for storing the result from divider 123 and performing shifting operation in synchronization with a clock signal at which following point data An+2 is inputted, and an adder 125 for adding the point data sent from DCS 110 and interpolated data to data stored in shift register 124 at every specific clock.

The operation and effect of the digital deflection control system of the projection TV according to the present invention will be explained below in detail with reference to the attached drawings. First of all, the RAM clock signal of DCS 110 for realizing the system of the present invention, that is, master clock signal (512fH), has 0.125 $\mu$s of one clock cycle, and time interval of the horizontal deflection point data outputted from DCS 110 is 4 $\mu$s which corresponds to 32 clocks approximately. The time required for outputting one horizontal line is 64 $\mu$s (16*4 $\mu$s).

Optional point data An (one of A1 to A16) of the first line, serially inputted from DCS 110, is stored in the first buffer until a latch selection signal LATCH_SEL is inputted, that is, the RAM clock of DCS 110 becomes thirty, and then corresponding point data is simultaneously transmitted to the second buffer, subtracter 122 and adder 125 at the thirty first RAM clock. Upon recognition of next latch selection signal LATCH_SEL, point data An+1 successively inputted is stored in the first buffer at the thirtieth RAM clock, and then transmitted to the second buffer, subtracter 122 and adder 125 at the thirty first clock. Simultaneously, point data An previously stored in the second buffer is sent to subtracter 122.

Subtracter 122 obtains the difference between two pieces of point data An and An+1, the input signals, and divider 123 divides the result by 8. Shift register 124 stores the result of divider 123 and carries out shifting operation in synchronization with the thirty first clock signal at which point data An+2 is inputted. Adder 125 outputs data corresponding to the first horizontal line without any change, and directly outputs data at the thirty first clock, which is the point data inputted from DCS 110, from the second horizontal line. At every four RAM clocks in reception of the point data, the adder adds the point data inputted right before the four RAM clocks to the interpolated data stored in shift register 124. The operation performed in DDC 120 for realizing the present invention is represented by the following expression.

$C1=B1+\{(A2-A1)/8\}$, $C2=B1+2*\{(A2-A1)/8\}$, ...., $C7=B1+7*\{(A2-A1)/8\}$ $D1=B2+\{(A3-A2)/8\}$, $D2=B2+2*\{(A3-A2)/8\}$, ...., $D7=B2+7*\{(A3-A2)/8\}$...

As described above, DDC 120 performs the third interpolation for the horizontal deflection point data to generate a 16-bit signal. D/A converter 130 receives the bit stream of the final digital data from DDC 120 and quantizes it, to generates a signal in the form of step wave. First passive filter 200 removes high frequency component from the deflection signal in step waveform sent from D/A converter 130 to shape the waveform of the resulting signal into smoother signal, applying it to the deflection coil.

Figure 5:
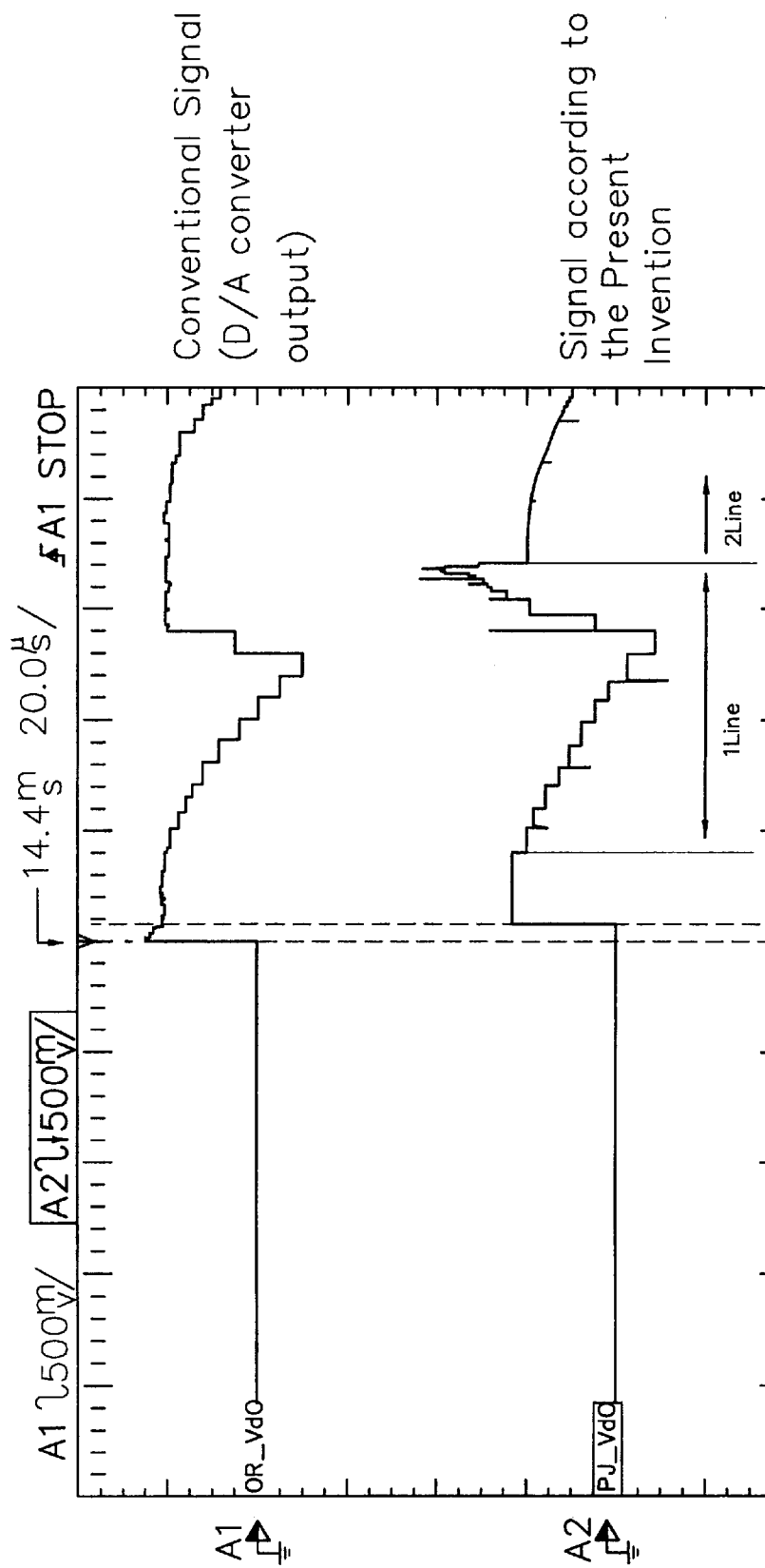
FIGS. 5 to 8 illustrate output signal waveforms of sections constructing the system according to the present invention.
Figure 6:
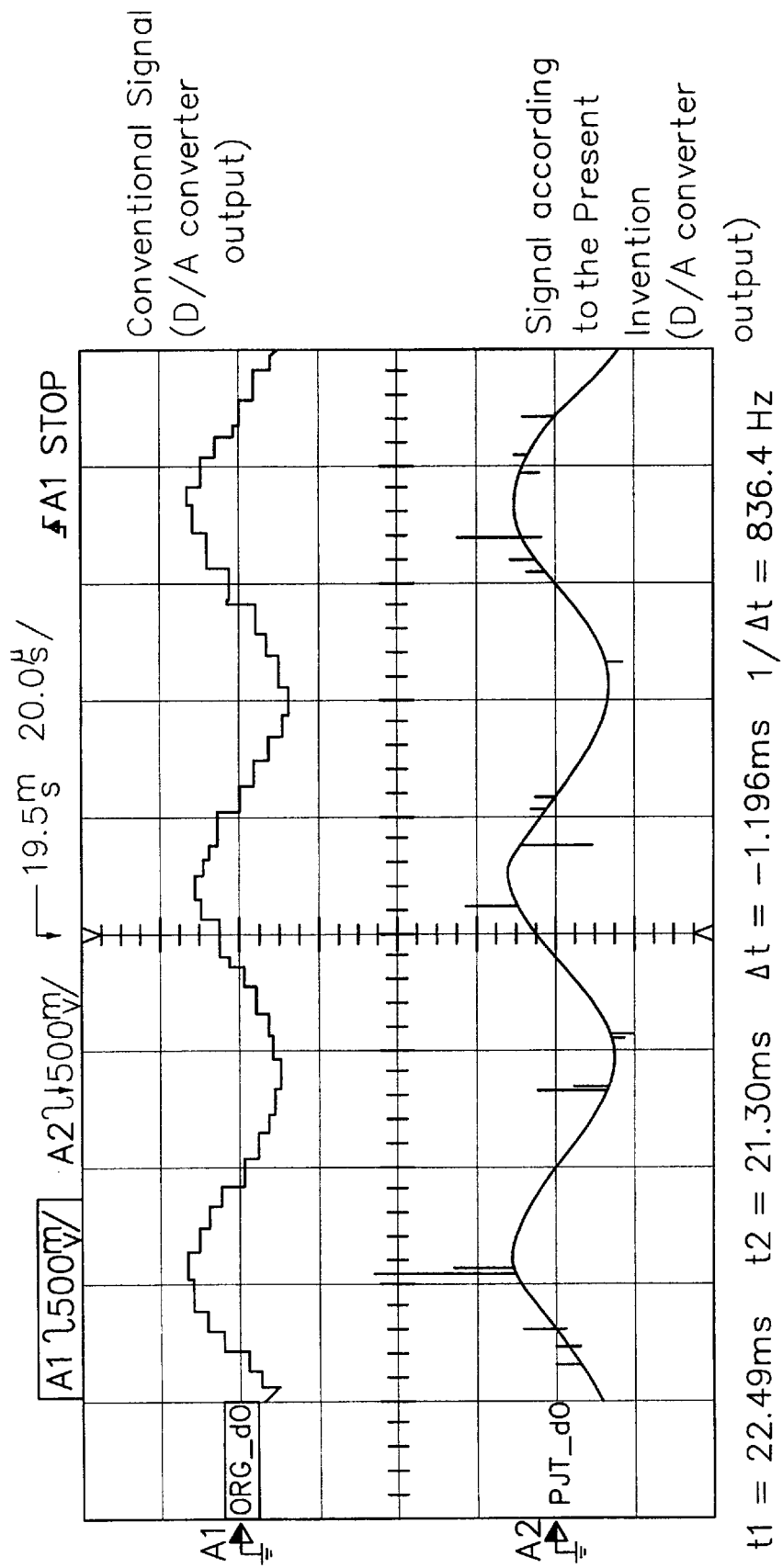
Figure 7:
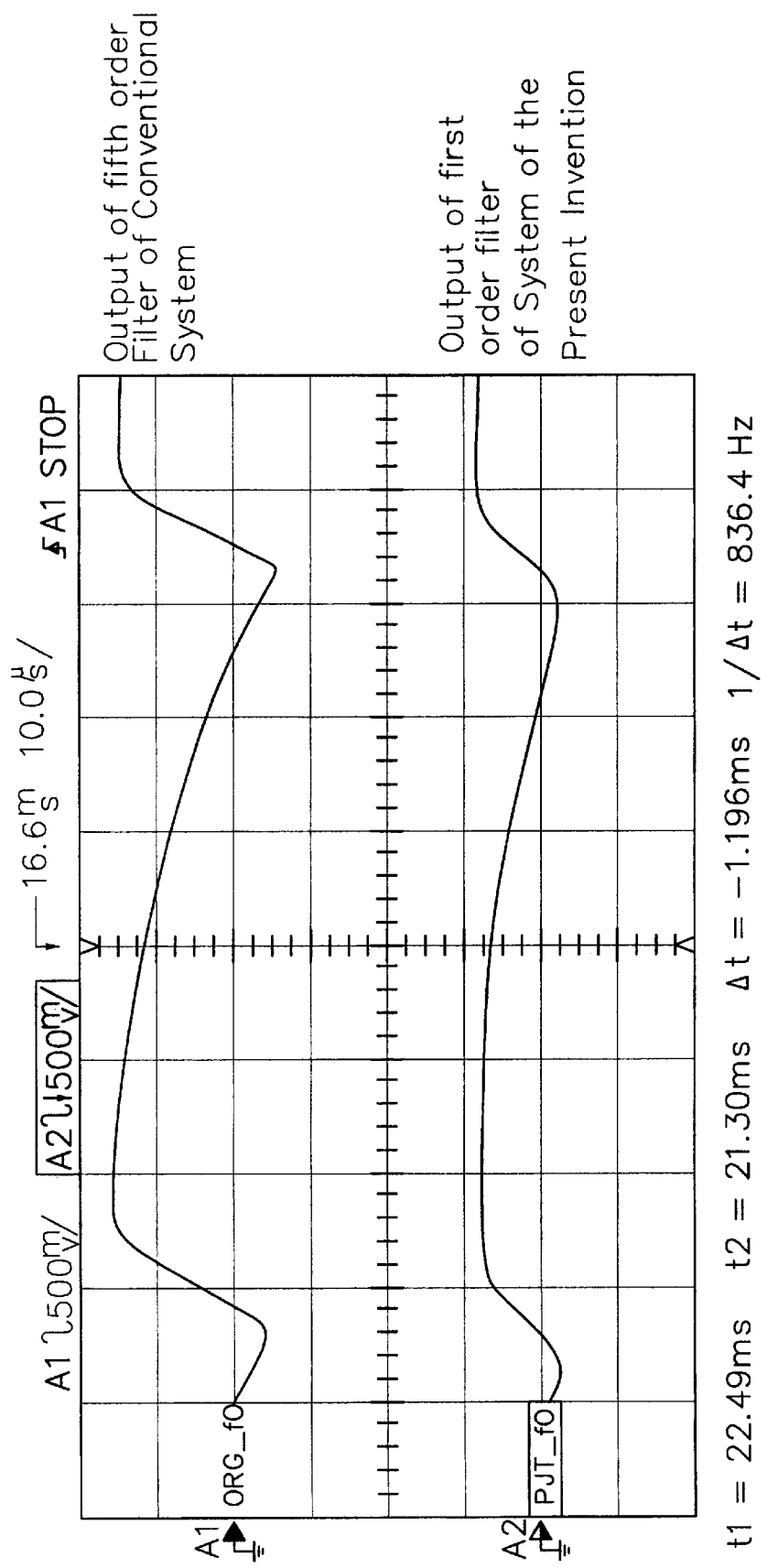
Figure 8:
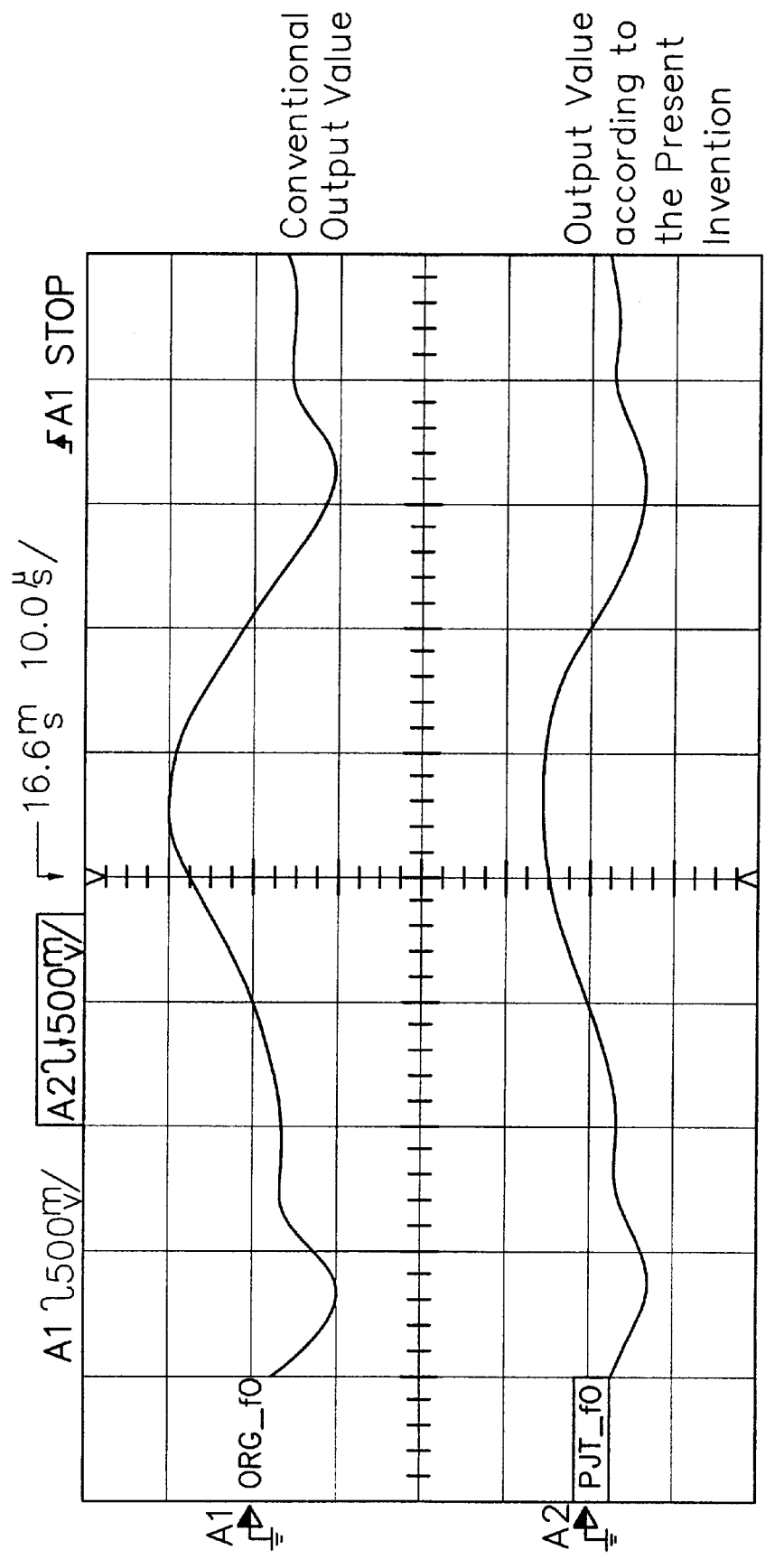

FIGS. 5 to 8 illustrate output waveforms of the sections constructing the system according to the present invention in comparison to the conventional ones. FIG. 5 shows the waveform of output signals of the first and second horizontal line outputted from D/A converter 130, and FIG. 6 shows the waveforms of the output signals of D/A converter 130 for the horizontal lines after the third one according to the prior art and present invention. Referring to FIGS. 5 and 6, the present invention does not need a high order LPF because the signal outputted from D/A converter 130 is smoother than the conventional horizontal deflection signal. FIG. 7 comparatively shows the output signal of a conventional fifth order LPF and output signal of the first order passive filter according to the present invention, and FIG. 8 shows output values according to the prior art and present invention. The present invention can obtain signal waveforms similar to the conventional ones by only employing the first order passive filter without using the conventional fifth order LPF.

In the digital deflection control system of a projection TV according to the present invention, as described above, filtering function, which was conventionally performed by a high order analog LPF, is executed through interpolation by the digital circuit. Accordingly, the principal parts of the system can be integrated into a single chip, resulting in low production cost and small-size space for the principal parts.

It will be apparent to those skilled in the art that various modifications and variations can be made in the digital deflection control system in a projection TV of the present invention without departing from the spirit or scope of the invention. Thus, it is intended that the present invention coveres the modifications and variations of this invention provided they come within the scope of the appended claims and their equivalents.

What is claimed is:

1. A digital deflection control system in a projection TV, the system comprising:

an EEPROM for storing vertical and horizontal deflection seed data for R, G, B color signals;

a CPU for loading each seed data from the EEPROM and performing the first interpolation for the horizontal deflection data;

a digital conversion circuit for performing the second interpolation for the vertical deflection data among the data first-interpolated by the CPU;

a digital deflection control for performing the third interpolation for the horizontal deflection data among the data second-interpolated by the digital conversion circuit;

a D/A converter for outputting the data third-interpolated by the digital deflection control as an analog signal in the form of step wave; and a filter for removing high frequency component from the signal in step waveform outputted from the D/A converter.

2. The system as claimed in the claim 1, wherein the digital deflection control comprises:

a buffer for temporarily storing horizontal signal data for one horizontal line, second-interpolated by the digital conversion circuit;

a subtracter for obtaining the difference (An+1)−An between two pieces of horizontal signal data An+1 and An for one horizontal line, sequentially inputted from the buffer, and outputting the subtraction result;

a divider for dividing the difference obtained by the subtracter by a predetermined divisor;

a shift register for storing the result value obtained by the divider, and performing shifting operation in synchronization with a clock signal at which following horizontal signal data An+2 is inputted; and an adder for adding horizontal signal data inputted from the digital conversion circuit at every specific clock to interpolation data stored in the shift register.

3. The system as claimed in claim 2, wherein the divisor is 4 or 8.

* * * * *